US008927843B2

(12) United States Patent
Tashima et al.

(10) Patent No.: US 8,927,843 B2
(45) Date of Patent: Jan. 6, 2015

(54) HEAD FIXING MECHANISM OF DRUM

(71) Applicant: Union Seimitsu Co., Ltd., Kanagawa (JP)

(72) Inventors: Tadashi Tashima, Kanagawa (JP); Masaki Nezu, Kanagawa (JP)

(73) Assignee: Union Seimitsu Co., Ltd., Kanagawa (JP)

( * ) Notice: Subject to any disclaimer, the term of this patent is extended or adjusted under 35 U.S.C. 154(b) by 0 days.

(21) Appl. No.: 14/093,242

(22) Filed: Nov. 29, 2013

(65) Prior Publication Data
US 2014/0290463 A1 Oct. 2, 2014

(30) Foreign Application Priority Data
Mar. 26, 2013 (JP) ................................. 2013-063254

(51) Int. Cl.
G10D 13/02 (2006.01)
(52) U.S. Cl.
CPC ............ G10D 13/027 (2013.01); G10D 13/026 (2013.01); G10D 13/023 (2013.01)
USPC .......................................................... 84/413
(58) Field of Classification Search
CPC ........................... G10D 13/026; G10D 13/023
See application file for complete search history.

(56) References Cited

U.S. PATENT DOCUMENTS

| 5,544,561 | A  | * | 8/1996  | Isomi .............................. 84/421 |
| 7,960,633 | B1 | * | 6/2011  | Chen .............................. 84/413 |
| 8,658,875 | B2 | * | 2/2014  | Albright ......................... 84/413 |
| 2014/0026736 | A1 | * | 1/2014 | Sato et al. ....................... 84/421 |
| 2014/0290463 | A1 | * | 10/2014 | Tashima et al. ................ 84/413 |

FOREIGN PATENT DOCUMENTS

JP 2006-58849 3/2006

* cited by examiner

Primary Examiner — Robert W Horn
(74) Attorney, Agent, or Firm — Lexyoume IP Meister, PLLC

(57) ABSTRACT

A head fixing mechanism includes a fixture fixed to a trunk portion and a coupling member which is threadably engaged with a fixture. The coupling member includes a main body which has a head portion that presses a head and a shaft portion that is threadably engaged with the fixture, and in which an axially extending insertion hole is formed, and an insertion member which is threadably engaged with the main body within the insertion hole. A bottom of the insertion hole is formed in the shaft portion, and in the shaft portion, a slit having a width smaller than the inside diameter of the insertion hole is formed, which divides the shaft portion in a circumferential direction. The insertion member is formed in a tapered shape, and the outside diameter of the leading end thereof is formed to be smaller than the width of the slit.

3 Claims, 7 Drawing Sheets

HEAD FIXING MECHANISM OF DRUM

BACKGROUND (a) Technical Field

This disclosure relates to a head fixing mechanism of a drum, and specifically relates to a head fixing mechanism provided in a drum including a head that covers an opening of a trunk portion and a hoop that holds the head onto the trunk portion.

(b) Description of the Related Art

In the past, a drum has included a head that covers an opening of a trunk portion, a hoop that holds the head onto the trunk portion, and a head fixing mechanism provided in the trunk portion. The head fixing mechanism presses the hoop against the trunk portion using a screw member such as a bolt. A person who tunes such drum adjusts a force that presses the hoop against the trunk portion by tightening or loosening the screw member of the head fixing mechanism, and adjusts the tension of the head.

When the drum is played, the drum vibrates as a whole and the screw member of the head fixing mechanism may be loosened due to the vibration, and thus the drum may get out of tune.

Consequently, a head adjustment apparatus is proposed in which a washer with rubber is provided between a lower surface of a head portion of the bolt and the hoop, and the washer with rubber is constituted by a rubber elastic body and a bowl-shaped cover of which external shape covers the outer circumference of the rubber elastic body (Japanese Unexamined Patent Application Publication No. 2006-58849).

According to the head adjustment apparatus, since vibration generated by the playing of the drum can be absorbed by the elastic body, it is possible to prevent the drum from getting out of tune due to the loosening of the bolt.

However, since the head adjustment apparatus disclosed in Japanese Unexamined Patent Application Publication No. 2006-58849 is provided with the washer with rubber in addition to the bolt, the number of parts to assemble are increased, and thus assembly processes of the drum may be complicated. In addition, when the head adjustment apparatus is used for a long period of time, rubber of the washer may be hardened due to aging degradation, and thus may not play the role of absorbing vibration.

SUMMARY

An exemplary embodiment of the present invention provides a head fixing mechanism capable of preventing a screw member from being loosened in a long period of use and maintaining a properly tuned state, without making assembly processes of a drum complicated.

(1) A head fixing mechanism which is provided in a drum comprising a cylindrical trunk portion having an opening formed therein, a head that covers the opening of the trunk portion, and a hoop that presses the head against an end of the trunk portion to hold the head onto the trunk portion, comprising:

a fixture which is fixed onto a lateral side of the trunk portion; and a coupling member threadably engaged with the fixture and configured to press the head against the end of the trunk portion with the hoop interposed therebetween, wherein the coupling member comprises a main body which has a head portion that presses the head against the end of the trunk portion with the hoop interposed therebetween and a shaft portion that extends from the head portion and has a leading end of which vicinity is threadably engaged with the fixture, the main body has an insertion hole axially extending along the shaft portion from the head portion, and an insertion member which is inserted from the head portion side into the insertion hole, and is threadably engaged with the main body within the insertion hole, wherein a bottom of the insertion hole is formed in the shaft portion, and the shaft portion has a slit with a width smaller than an inside diameter of the insertion hole, axially extending along the shaft portion from the leading end of the shaft portion until reaching at least the bottom of the insertion hole, and dividing the shaft portion in a circumferential direction, and wherein an outside diameter of a leading end of the insertion member is smaller than the width of the slit.

According to the invention of (1), the head fixing mechanism is provided in the drum including the cylindrical trunk portion having an opening formed thereon, the head that covers the opening of the trunk portion, and the hoop that presses the head against the end of the trunk portion to hold the head onto the trunk portion.

The head fixing mechanism includes the fixture and the coupling member.

The fixture is fixed onto the lateral side of the trunk portion.

The coupling member is threadably engaged with the fixture, and presses the head against the end of the trunk portion with the hoop interposed therebetween. In addition, the coupling member includes the main body and the insertion member.

The main body has the head portion and the shaft portion extending from the head portion, and the insertion hole axially extending along the shaft portion from the head portion is formed therein.

The head portion presses the head against the end of the trunk portion with the hoop interposed therebetween.

The vicinity of the leading end of the shaft portion is threadably engaged with the fixture.

The insertion member is inserted from the head portion side into the insertion hole, and is threadably engaged with the main body within the insertion hole.

The bottom of the insertion hole is formed in the shaft portion, and the shaft portion has the slit with a width smaller than the inside diameter of the insertion hole. The slit axially extends from the leading end of the shaft portion until reaching at least the bottom of the insertion hole, and divides the shaft portion in a circumferential direction.

In addition, the outside diameter of the leading end of the insertion member is formed to be smaller than the width of the slit.

The drum provided with the head fixing mechanism of the present invention is assembled by a user according to the following procedure.

The user puts the head on the opening of the trunk portion, and mounts the hoop onto the head. The user then inserts the main body of the coupling member from the leading end into, for example, a hole, formed in the hoop, into which the coupling member is inserted, or a hole, formed in a metal fitting hung on the hoop, into which the coupling member is inserted, and causes the shaft portion of the main body to be threadably engaged with the fixture fixed onto the lateral side of the trunk portion.

Thereby, the head of the trunk portion is fixed, and the assembly of the drum is completed.

Next, a procedure of tuning the drum provided with the head fixing mechanism of the present invention will be described.

First, the user fastens the coupling member having the shaft portion threadably engaged with the fixture, to the maximum. That is, at this state, the tension of the head is maximized. Next, while loosening the coupling member step by step, that is, weakening the tension of the head step by step, the user beats the head, and searches for tension capable of generating an appropriate sound. The user stops loosening the coupling member at the time when the most appropriate sound is generated. This state is a state where the drum is properly tuned.

Next, the user screws the insertion member toward the leading end of the shaft portion in the insertion hole of the main body. Then, the leading end of the insertion member is inserted in the slit on the bottom of the insertion hole. When the user further screws the insertion member, the leading end of the insertion member comes into contact with the bottom of the insertion hole. Therefore, the width of the slit increases from the leading end of the shaft portion of the main body, and the outside diameter of the shaft portion increases.

Thereby, the fixture which is threadably engaged with the shaft portion is compressed by the shaft portion in the radial direction, and thus it is possible to prevent the threadable engagement of the shaft portion with the fixture from being loosened.

Consequently, the user can assemble the drum just by fixing the hoop that holds the head to the fixture fixed to the trunk portion, through the coupling member, without using a material such as rubber which is relatively subject to aging degradation.

In addition, the user compresses the fixture which is threadably engaged with the shaft portion from the radial direction of the shaft portion in a state where the drum is properly tuned, and thus it is possible to prevent the threadable engagement of the shaft portion with the fixture from being loosened.

Therefore, it is possible to provide a head fixing mechanism capable of preventing a screw member from being loosened in a long period of use and maintaining a properly tuned state, without making assembly processes of a drum complicated.

(2) In the head fixing mechanism according to the above (1), the insertion member includes an insertion shaft portion which is threadably engaged with the main body, and an insertion head portion which is formed with an outside diameter larger than an outside diameter of the insertion shaft portion and is provided at a base end of the insertion shaft portion, and a contact portion with which the insertion head portion comes into contact, in the insertion hole, is formed in the shaft portion of the coupling member.

According to the invention of (2), in the insertion hole of the main body, when the insertion member is screwed toward the leading end of the shaft portion, the insertion head portion of the insertion member comes into contact with the contact portion formed in the shaft portion of the main body.

Thereby, it is possible to prevent the insertion member from being screwed onto the main body more than necessary.

In addition, the user can further apply a screwing force in a state where the insertion head portion of the insertion member comes into contact with the contact portion of the main body. Thereby, the state where the fixture to be threadably engaged with the shaft portion is compressed by the shaft portion in the radial direction can be fixed more strongly.

Therefore, it is possible to more reliably prevent the threadable engagement of the shaft portion with the fixture from being loosened.

(3) In the head fixing mechanism according to the above (2), the insertion shaft portion of the insertion member has an outer circumferential surface on the leading end side on which non-slip processing is performed.

According to the invention of (3), non-slip processing is performed on the outer circumferential surface of the insertion member which comes into contact with the bottom of the insertion hole when the insertion member is screwed toward the leading end of the shaft portion.

Thereby, it is possible to prevent a force that compresses the fixture from being weakened due to a decrease of the outside diameter of the shaft portion caused by a slip of the outer circumferential surface of the insertion member which comes into contact with the bottom of the insertion hole, in a state where the fixture which is threadably engaged with the shaft portion is compressed in the radial direction of the shaft portion.

Therefore, it is possible to more reliably prevent the threadable engagement of the shaft portion with the fixture from being loosened.

According to an exemplary embodiment of the present invention, it is possible to provide a head fixing mechanism capable of preventing a screw member from being loosened in a long period of use and maintaining a properly tuned state, without making assembly processes of a drum complicated.

DETAILED DESCRIPTION OF THE EMBODIMENTS

Figure 1:
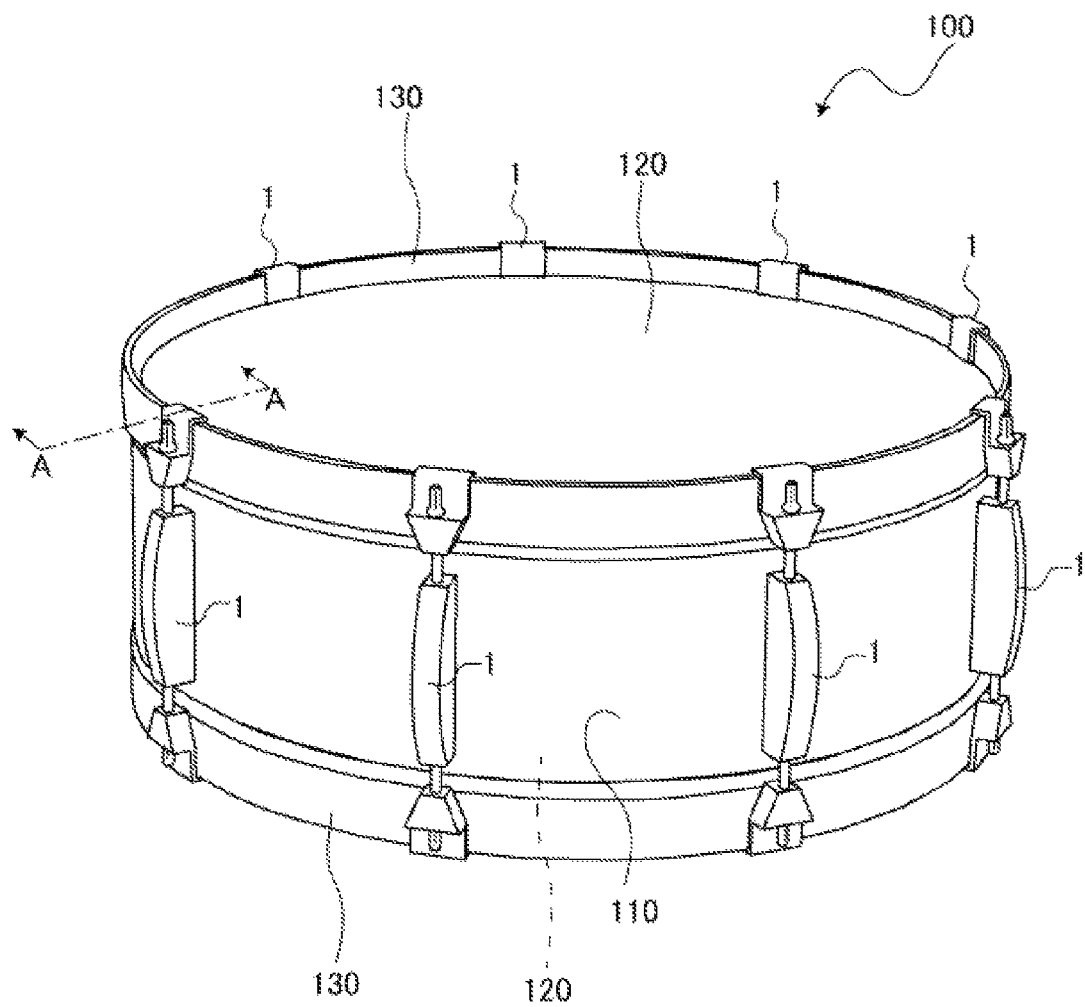
FIG. 1 is a perspective view of a drum to which head fixing mechanism according to an exemplary embodiment of the present invention are applied.

Advantages and features of the present invention and methods to achieve them will be elucidated from exemplary embodiments described below in detail with reference to the accompanying drawings. However, the present invention is not limited to exemplary embodiment disclosed herein but may be implemented in various forms. The exemplary embodiments are provided by way of example only so that a person of ordinary skill in the art can fully understand the disclosures of the present invention and the scope of the present invention. Therefore, the present invention will be defined only by the scope of the appended claims.

Hereinafter, an embodiment of the present invention will be described with reference to the accompanying drawings. In the following description, the same components are denoted by the same reference numerals and signs, and the description thereof will be omitted or simplified.

FIG. 1 is a perspective view of a drum 100 to which head fixing mechanisms 1 according to an exemplary embodiment of the present invention are applied.

As shown in FIG. 1, the drum 100 includes a cylindrical trunk portion 110 having an opening formed on both ends, a pair of heads 120 that cover the opening of the trunk portion 110 on the both ends, respectively, a pair of hoops 130 that press the pair of heads 120 against the both ends of the trunk portion 110, respectively, and hold the pair of heads 120 onto the trunk portion 110, respectively, and a plurality of head fixing mechanisms 1 which are provided on the lateral side of the trunk portion 110 at predetermined intervals in a circumferential direction.

Figure 2:
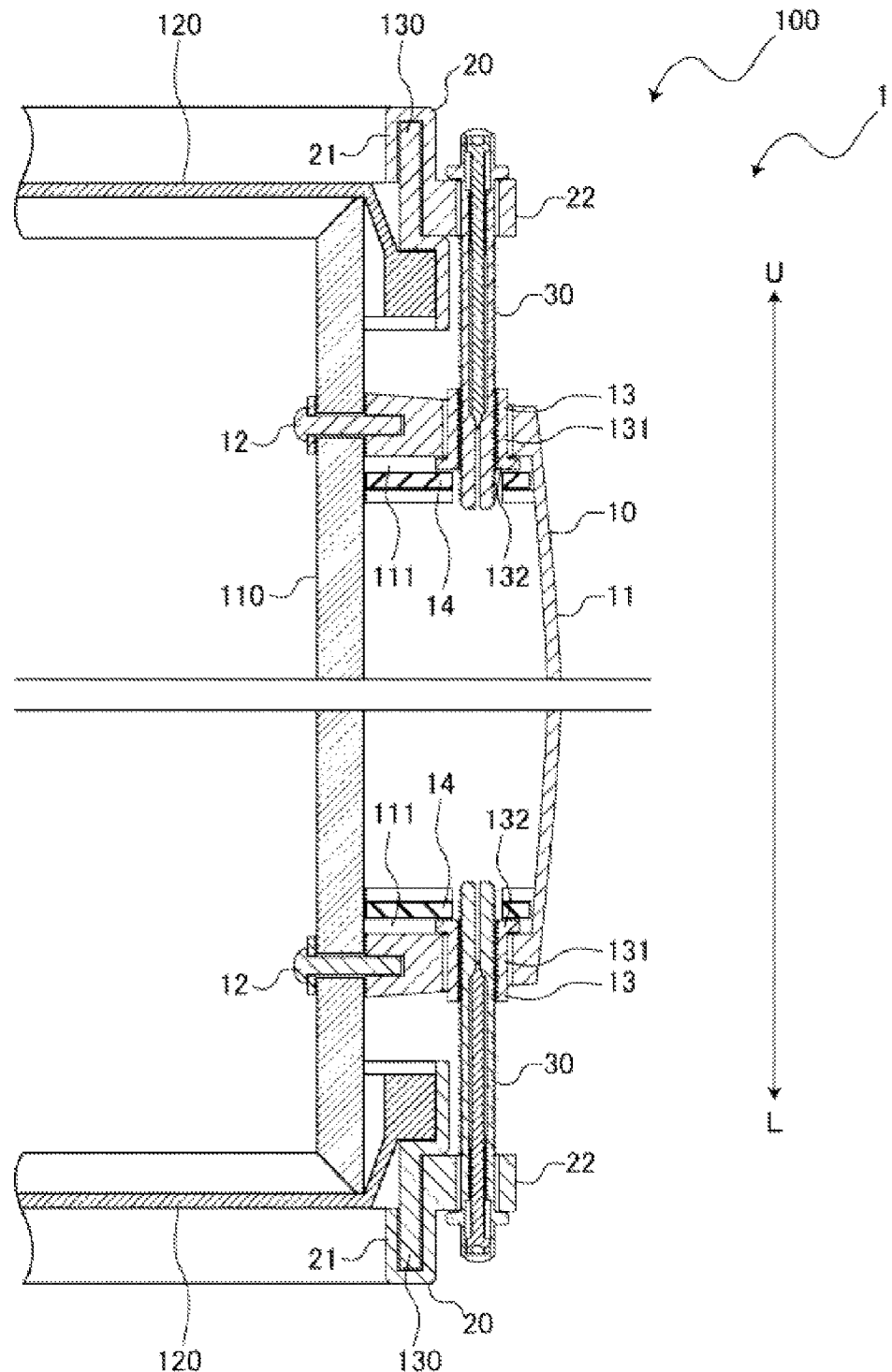
FIG. 2 is a partial cross-sectional view of the drum according to the exemplary embodiment which is taken along the direction of AA shown in FIG. 1.

FIG. 2 is a partial cross-sectional view of the drum 100 which is taken along the direction of AA shown in FIG. 1.

The head fixing mechanism 1 includes a fixture 10 fixed onto the lateral side of the trunk portion 110, a pair of hoop fixing metal fittings 20 that pinch a pair of hoops 130, respectively, and a pair of coupling members 30 that couple the fixture 10 to the pair of hoop fixing metal fittings 20, respectively.

In the present embodiment, the head fixing mechanism 1 includes the pair of hoop fixing metal fittings 20, but is not limited thereto. For example, when a hole which is engaged with the coupling member 30 is formed in the hoop 130, the head fixing mechanism 1 may be configured such that the pair of hoop fixing metal fittings 20 are omitted, and that the hoop 130 and the fixture 10 are coupled to each other by the coupling member 30.

In addition, in the present embodiment, the head fixing mechanism 1 couples one fixture 10 to the pair of hoops 130, but is not limited thereto, and may be configured such that a pair of fixtures are provided, and that one hoop 130 and one fixture are coupled to each other.

The fixture 10 includes a fixture main body 11, formed in a box shape, which has a long side in a vertical direction (direction of UL in FIG. 2), a pair of screws 12 that fix the trunk portion 110 to the upper end and the lower end of the fixture main body 11, respectively, a pair of coupling member receiving portions 13, respectively provided at the upper end and the lower end of the fixture main body 11 and received in receiving portions 111, which are threadably engaged with the pair of coupling members 30, respectively, and a vibration absorbing member 14 provided between the coupling member receiving portion 13 and the fixture main body 11.

The coupling member receiving portion 13 includes a cylindrical body 131 and a substantially rectangular foundation 132, connected to the base end of the cylindrical body 131, in which a hole having the same inside diameter as the inside diameter of the cylindrical body 131 is formed. Screw threads which are threadably engaged with the outer circumferential surface of the coupling member 30 are formed in the inner walls of the cylindrical body 131 and the hole of the foundation 132.

The coupling member receiving portion 13 provided on the upper end side of the fixture main body 11 is configured such that the leading end (end on the opposite side to the base end to which the foundation 132 is connected) thereof is disposed toward the upper direction (direction of U in FIG. 2).

The coupling member receiving portion 13 provided on the lower end side of the fixture main body 11 is configured such that the leading end thereof is disposed toward the lower direction (direction of L in FIG. 2).

The vibration absorbing member 14 is formed of an elastic member such as, for example, rubber or synthetic resin, and a hole having an inside diameter larger than the inside diameter of the cylindrical body 131 of the coupling member receiving portion 13 is formed therein.

The vibration absorbing member 14 is received in the receiving portion 111 of the fixture main body 11 together with the coupling member receiving portion 13, in a state where the vibration absorbing member comes into contact with the foundation 132 of the coupling member receiving portion 13.

The hoop fixing metal fitting 20 includes a pinch portion 21 that pinches the hoop 130, and a coupling member engaging portion 22, protruding in a horizontal direction from the lateral side of the pinch portion 21, in which a hole for inserting the coupling member 30 therein is formed.

The coupling member 30 is threadably engaged with the coupling member receiving portion 13 of the fixture 10, and presses the head 120 against the end of the trunk portion 110 through the hoop 130.

Figure 3:
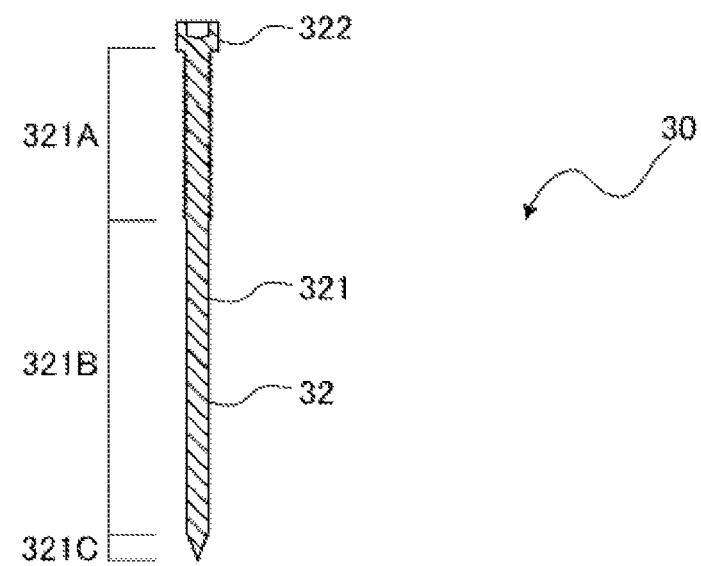
FIG. 3 is a diagram illustrating a coupling member of the head fixing mechanism according to the exemplary embodiment.
Figure 3:
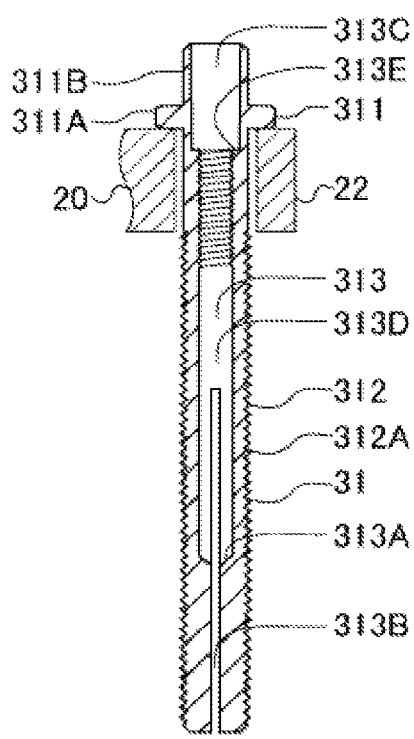
Figure 3:
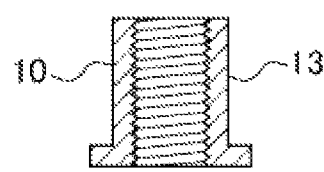

FIG. 3 is a diagram illustrating the coupling member 30 of the head fixing mechanism 1 according to the above-mentioned embodiment.

The coupling member 30 includes a main body 31 and an insertion member 32 which is inserted in the inside of the main body 31.

The main body 31 includes a head portion 311 which is formed with an outside diameter larger than the diameter of a hole formed in the coupling member engaging portion 22 of the hoop fixing metal fitting 20, and a shaft portion 312, extending from the head portion 311, which is formed with an outside diameter smaller than the diameter of the hole formed in the coupling member engaging portion 22, and includes an insertion hole 313, axially extending along the shaft portion 312 from the head portion 311, which is formed up to the intermediate portion of the shaft portion 312.

Thereby, when the shaft portion 312 is inserted in the hole formed in the coupling member engaging portion 22, the head portion 311 of the coupling member 30 comes into contact with the coupling member engaging portion 22.

The head portion 311 presses the head 120 (see FIG. 2) against the end of the trunk portion 110 (see FIG. 2) with the hoop 130 (see FIG. 2) interposed therebetween.

Specifically, the head portion 311 includes a base 311A which is formed in a plate-shaped body having an outside diameter larger than the diameter of the hole formed in the coupling member engaging portion 22, and an upright standing portion 311B, formed in a quadrangular cylindrical shape, which stands upright from one side of the base 311A.

In the present embodiment, the upright standing portion 311B is formed in a quadrangular cylindrical shape in accordance with the shape of a normal tool which is used to fasten the coupling member 30 at the time of the assembly and tuning of the drum, but is not limited thereto. For example, the upright standing portion may be formed in a hexagonal cylindrical shape or the like in accordance with the shape of a tool such as a normal spanner.

The shaft portion 312 extends from the other side of the base 311A of the head portion 311, has screw threads formed on an outer circumferential surface 312A, and is threadably engaged with screw threads formed on the inner wall of the coupling member receiving portion 13 of the fixture 10 in the vicinity of the leading end.

A bottom 313A of the insertion hole 313 is formed in the intermediate portion of the shaft portion 312.

In addition, in the shaft portion 312, a slit 313B having a width smaller than the inside diameter of the insertion hole 313 is formed, which axially extends from the leading end (end on the opposite side to the end which is connected to the base 311A) thereof, reaches at least the bottom 313A, and divides the shaft portion 312 in a circumferential direction.

In the present embodiment, an inclined plane descending from the outer circumference of the insertion hole 313 toward the slit 313B is formed on the bottom 313A. Therefore, the bottom 313A may be formed in a hemispherical inside shape bulging out toward the leading end of the shaft portion 312, without being limited thereto.

The insertion hole 313 includes a large-diameter portion 313C formed in the head portion 311 and in the vicinity of the shaft portion 312 on the head portion 311, and a small-diameter portion 313D formed with an inside diameter smaller than the diameter of the large-diameter portion 313C between the large-diameter portion 313C and the bottom 313A.

In the large-diameter portion 313C, a contact portion 313E with which a portion of the insertion member 32 comes into contact is formed, which corresponds to a step difference between the small-diameter portion 313D and the large-diameter portion.

In the inner wall of the small-diameter portion 313D, screw threads which are threadably engaged with the insertion member 32 are formed within a predetermined range on the large-diameter portion 313C side.

The insertion member 32 is inserted from the head portion 311 side of the main body 31 into the insertion hole 313, and is threadably engaged with the main body 31 within the insertion hole 313.

Specifically, the insertion member 32 includes an insertion shaft portion 321 which is threadably engaged with the main body 31, and an insertion head portion 322 which is formed with an outside diameter larger than the outside diameter of the insertion shaft portion 321 and is provided at the base end of the insertion shaft portion 321.

The insertion shaft portion 321 includes a screw thread portion 321A, a non-slip portion 321B, and a leading end portion 321C, from the base end thereof toward the leading end.

In the screw thread portion 321A, screw threads which are threadably engaged with the screw threads formed on the inner wall of the small-diameter portion 313D of the main body 31 are formed on the outer circumferential surface in a predetermined range on the base end side.

In the non-slip portion 321B, non-slip processing is performed on the outer circumferential surface closer to the leading end side than the screw thread portion 321A. In the present embodiment, the non-slip processing causes a plurality of stripes to be formed in a circumferential direction on the outer circumferential surface, but is not limited thereto. As long as the friction of the outer circumferential surface increases, any method, such as blasting to roughen the outer circumferential surface may be employed.

The leading end portion 321C is formed to have a gradually decreasing outside diameter from the non-slip portion 321B toward the leading end.

The outside diameter of the leading end of the insertion shaft portion 321 is formed to be smaller than the width of the slit 313B formed in the shaft portion 312 of the main body 31.

In the present embodiment, the leading end portion 321C is formed in a tapered shape as an example in which the outside diameter thereof gradually decreases toward the leading end of the insertion shaft portion 321, and the leading end thereof is formed at an acute angle (in a so-called sword point shape). Therefore, the leading end portion 321C may be formed in a tapered shape without being limited thereto, and the leading end thereof may be formed in a planar shape. In addition, the leading end portion 321C may be formed in a hemispherical shape.

In addition, in the present embodiment, the bottom 313A of the insertion hole 313 in the shaft portion 312 is formed to have an inclined plane, and the leading end portion 321C is formed to have a gradually decreasing outside diameter. Nevertheless, when the leading end portion 321C is formed to have a gradually decreasing outside diameter, the bottom 313A may be a horizontal plane without being limited to an inclined plane. On the other hand, when the bottom 313A is formed to have an inclined plane, the leading end portion 321C may be formed to have a shape of which outside diameter is not gradually decreased.

Figure 4:
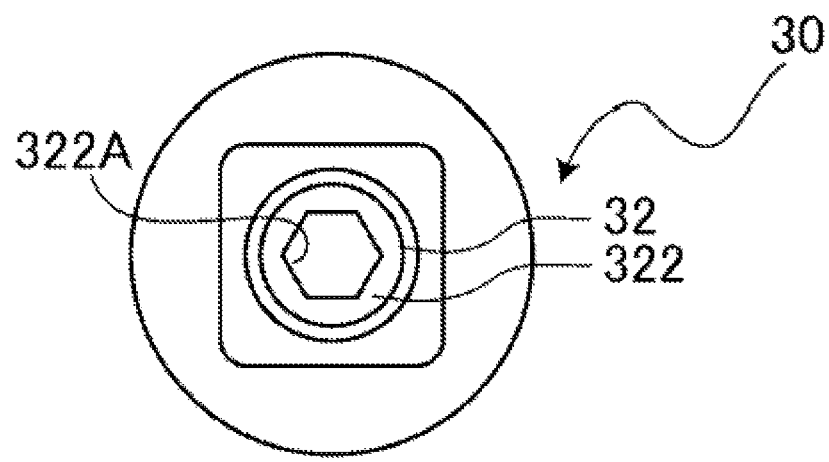
FIG. 4 is a plan view of the coupling member according to the exemplary embodiment.

FIG. 4 is a plan view of the coupling member 30 according to the above-mentioned embodiment.

The insertion head portion 322 is formed in a circular cylindrical shape, and an operation hole 322A formed in a hexagonal cylindrical shape is formed in the center thereof.

A hexagonal wrench fits into the operation hole 322A. A user inserts the hexagonal wrench in the operation hole 322A, and rotates the hexagonal wrench, thereby allowing the insertion member 32 to be screwed into the main body 31 (see FIG. 3).

Meanwhile, the shape of the operation hole 322A is not limited to a hexagonal cylindrical shape.

Figure 5:
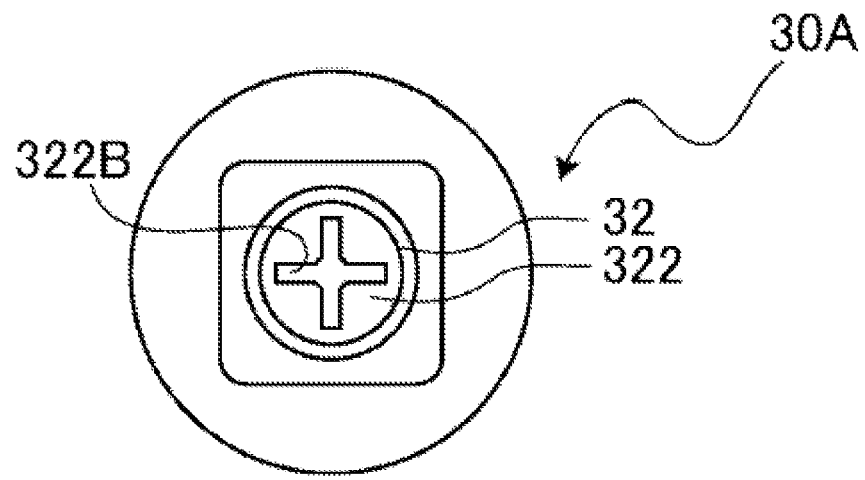
FIG. 5 is a plan view of a coupling member according to a first modified example of the coupling member according to the exemplary embodiment.

FIG. 5 is a plan view of a coupling member 30A according to a first modified example of the coupling member 30 according to the above-mentioned embodiment.

The coupling member 30A according to the first modified example is different from the coupling member 30 according to the embodiment in the shape of the operation hole of the insertion head portion 322 of the insertion member 32.

In the insertion head portion 322, a recess having a cross slot (+) shape is formed as an operation hole 322B. In this case, a cross slot screwdriver fits into the operation hole 322B. A user inserts the cross slot screwdriver in the operation hole 322B, and rotates the cross slot screwdriver, thereby allowing the insertion member 32 to be screwed into the main body 31 (see FIG. 3).

In addition, the coupling member 30A may be configured such that a recess having a straight slot (-) shape is formed as the operation hole 322B.

Figure 6:
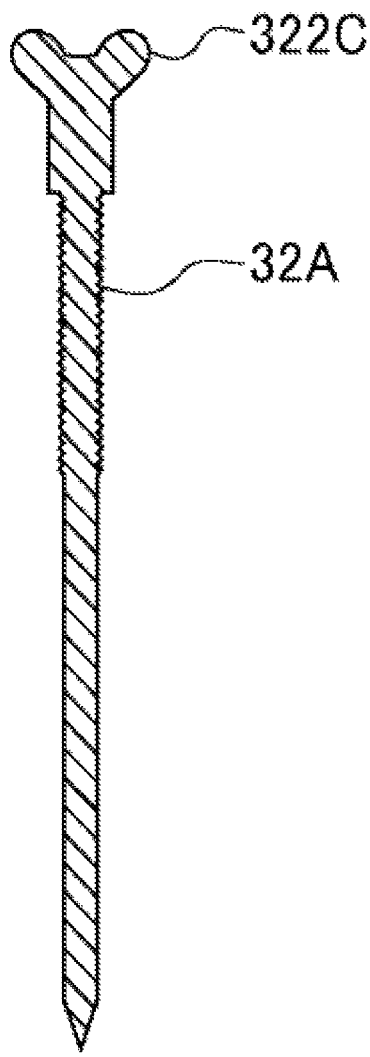
FIG. 6 is a cross-sectional view of an insertion member according to a second modified example of the insertion member according to the exemplary embodiment.

FIG. 6 is a cross-sectional view of an insertion member 32A according to a second modified example of the insertion member 32 according to the above-mentioned embodiment.

The insertion member 32A according to the second modified example is different from the insertion member 32 according to the above-mentioned embodiment, in that a grasping portion 322C is included instead of the operation hole.

In this case, a user grasps and rotates the grasping portion 322C, thereby allowing the insertion member 32A to be screwed into the main body 31 (see FIG. 3).

Next, a procedure of assembling the drum 100 to which the head fixing mechanism 1 according to the embodiment is applied will be described with reference to FIGS. 2 and 3.

As shown in FIG. 2, a user puts the head 120 on the opening of the trunk portion 110, and mounts the hoop 130 onto the head 120. The user then hangs the hoop fixing metal fitting 20 on the hoop 130, in accordance with the position of the fixture 10 fixed to the trunk portion 110.

As shown in FIG. 3, the main body 31 of the coupling member 30 is inserted from the leading end into the hole formed in the coupling member engaging portion 22 of the hoop fixing metal fitting 20, and the shaft portion 312 of the main body 31 is caused to be threadably engaged with the fixture 10.

Thereby, the head 120 is fixed to the trunk portion 110, and the assembly of the drum 100 is completed.

Next, a procedure of tuning the drum 100 of which the assembly is completed will be described.

First, a user fastens the coupling member 30 having the shaft portion 312 threadably engaged with the fixture 10, to the maximum. That is, in the drum 100 in this state, the tension of the head 120 is maximized. Next, while loosening the coupling member 30 step by step, that is, weakening the tension of the head 120 step by step, the user beats the head 120, and searches for tension capable of generating an appropriate sound. The user stops loosening the coupling member 30 at the time when the most appropriate sound is generated. This is the properly tuned state of the drum 100.

Next, a description will be made of a procedure for preventing the threadable engagement of the coupling member 30 with the fixture 10 from being loosened in the tuned drum 100.

Figure 7:
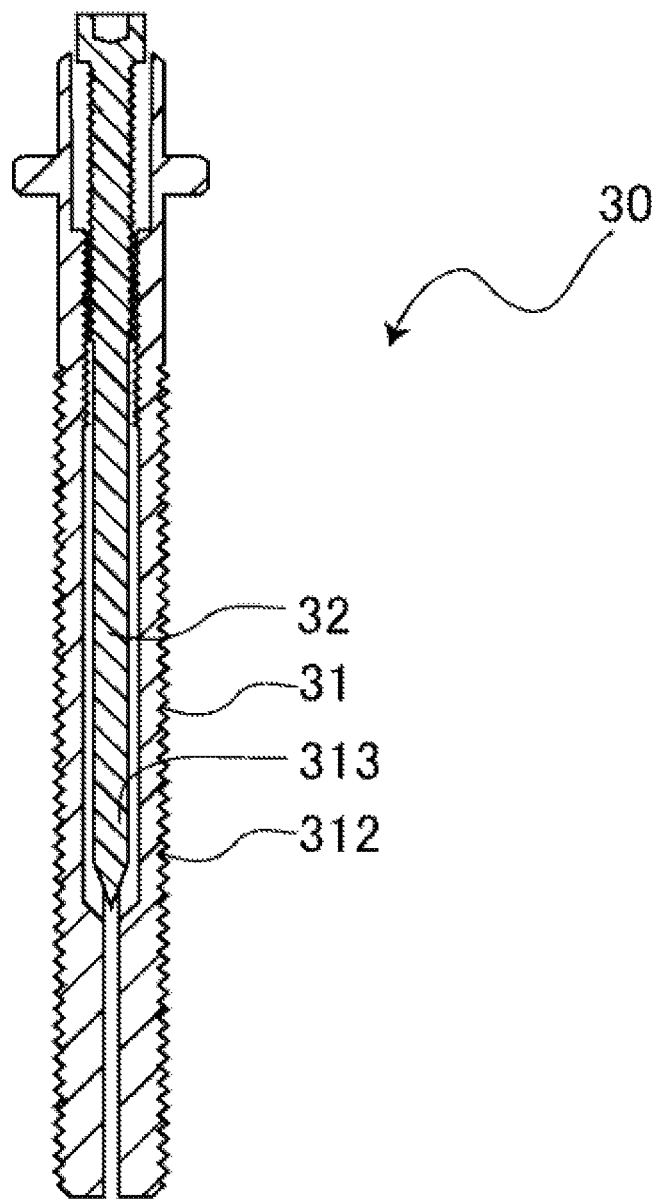
FIG. 7 is a diagram illustrating an operation of the coupling member according to the exemplary embodiment.
Figure 8:
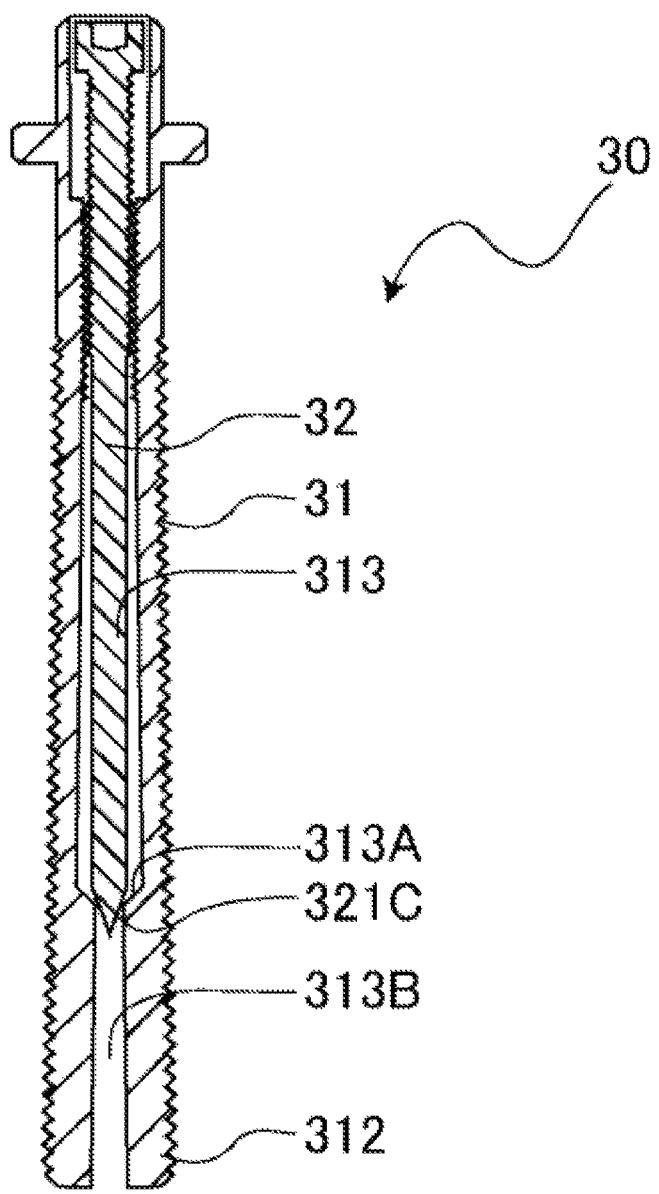
FIG. 8 is a diagram illustrating an operation of the coupling member according to the exemplary embodiment.

FIGS. 7 and 8 are diagrams illustrating operations of the coupling member 30 according to the above-mentioned embodiment.

FIG. 7 shows the coupling member 30 in a state before an operation for preventing the threadable engagement of the coupling member 30 with the fixture 10 from being loosened is performed.

FIG. 8 shows the coupling member 30 in a state where an operation for preventing the threadable engagement of the coupling member 30 with the fixture 10 from being loosened is performed.

In the state shown in FIG. 7, a user screws the insertion member 32 toward the leading end of the shaft portion 312 in the insertion hole 313 of the main body 31. Then, as shown in FIG. 8, the leading end of the insertion member 32 is inserted in the slit 313B on the bottom 313A of the insertion hole 313. When the user further screws the insertion member 32, the outer circumferential surface of the leading end portion 321C in the insertion member 32 comes into contact with the bottom 313A of the insertion hole 313. Therefore, the width of the slit 313B increases from the leading end of the shaft portion 312 of the main body 31, and the outside diameter of the shaft portion 312 increases.

Thereby, the coupling member receiving portion 13 (see FIG. 3) of the fixture 10 which is threadably engaged with the shaft portion 312 is compressed by the shaft portion 312 in the radial direction, and thus the threadable engagement of the shaft portion 312 with the fixture 10 is prevented from being loosened.

Consequently, according to the above-mentioned embodiment, a user can assemble the drum 100 just by fixing the hoop 130 that holds the head 120 to the fixture 10 fixed to the trunk portion 110, through the coupling member 30, without using a material such as rubber which is relatively subject to aging degradation.

In addition, when the drum 100 is properly tuned, a user may compress the fixture 10 which is threadably engaged with the shaft portion 312 in the radial direction of the shaft portion 312 and thus prevent the threadable engagement of the shaft portion 312 with the fixture 10 from being loosened.

Therefore, it is possible to provide a head fixing mechanism capable of preventing a screw member from being loosened in a long period of use and maintaining a properly tuned state, without making assembly processes of a drum complicated.

In addition, according to the above-mentioned embodiment, in the insertion hole 313 of the main body 31, when the insertion member 32 is screwed toward the leading end of the shaft portion 312, the insertion head portion 322 of the insertion member 32 comes into contact with the contact portion 313E formed in the shaft portion 312 of the main body 31.

Thereby, it is possible to prevent the insertion member 32 from being screwed onto the main body 31 more than necessary.

In addition, a user can further apply a screwing force in a state where the insertion head portion 322 of the insertion member 32 comes into contact with the shaft portion 312 of the main body 31. Thereby, the state where the fixture to be threadably engaged with the shaft portion is compressed in the radial direction of the shaft portion can be fixed more strongly.

In addition, according to the above-mentioned embodiment, in the insertion hole 313 of the main body 31, when the insertion member 32 is screwed toward the leading end of the shaft portion 312, non-slip processing is performed on the outer circumferential surface of the insertion member 32 which comes into contact with the bottom 313A of the insertion hole 313.

Thereby, it is possible to prevent a force that compresses the fixture 10 from being weakened due to a decrease of the outside diameter of the shaft portion caused by a slip of the outer circumferential surface of the insertion member 32 which comes into contact with the bottom 313A of the insertion hole 313, in a state where the fixture 10 which is threadably engaged with the shaft portion 312 is compressed in the radial direction of the shaft portion 312.

Therefore, it is possible to more reliably prevent the threadable engagement of the shaft portion with the fixture from being loosened.

It will be apparent to those skilled in the art that various modifications and variations can be made in the present invention without departing from the scope or spirit of the invention. Thus, it is intended that the present invention cover the modifications and variations of this invention provided that they come within the scope of the appended claims or their equivalents.

What is claimed is:

1. A head fixing mechanism which is provided in a drum comprising a cylindrical trunk portion having an opening formed therein, a head that covers the opening of the trunk portion, and a hoop that presses the head against an end of the trunk portion to hold the head onto the trunk portion, comprising:
   a fixture which is fixed onto a lateral side of the trunk portion; and
   a coupling member threadably engaged with the fixture and configured to press the head against the end of the trunk portion with the hoop interposed therebetween,
   wherein the coupling member comprises
   a main body which has a head portion that presses the head against the end of the trunk portion with the hoop interposed therebetween and a shaft portion that extends from the head portion and has a leading end of which vicinity is threadably engaged with the fixture, the main body has an insertion hole axially extending along the shaft portion from the head portion, and
   an insertion member which is inserted from the head portion side into the insertion hole, and is threadably engaged with the main body within the insertion hole,
   wherein a bottom of the insertion hole is formed in the shaft portion, and
   the shaft portion has a slit with a width smaller than an inside diameter of the insertion hole, axially extending along the shaft portion from the leading end of the shaft portion until reaching at least the bottom of the insertion hole, and dividing the shaft portion in a circumferential direction, and wherein an outside diameter of a leading end of the insertion member is smaller than the width of the slit.

2. The head fixing mechanism according to claim 1, wherein the insertion member comprises an insertion shaft portion which is threadably engaged with the main body, and an insertion head portion which is formed with an outside diameter larger than an outside diameter of the insertion shaft portion and is provided at a base end of the insertion shaft portion, and the shaft portion of the coupling member has a contact portion with which the insertion head portion comes into contact in the insertion hole.

3. The head fixing mechanism according to claim 2, wherein the insertion shaft portion of the insertion member has an outer circumferential surface on the leading end side on which non-slip processing is performed.

\* \* \* \* \*